July 16, 1963

H. P. RAABE 3,098,229

TRANSMISSION LINE ERECTED BY PRESSURIZED PLASTIC

Filed June 17, 1959

INVENTOR.
HERBERT P. RAABE
BY
William C. Babcock
ATTORNEY

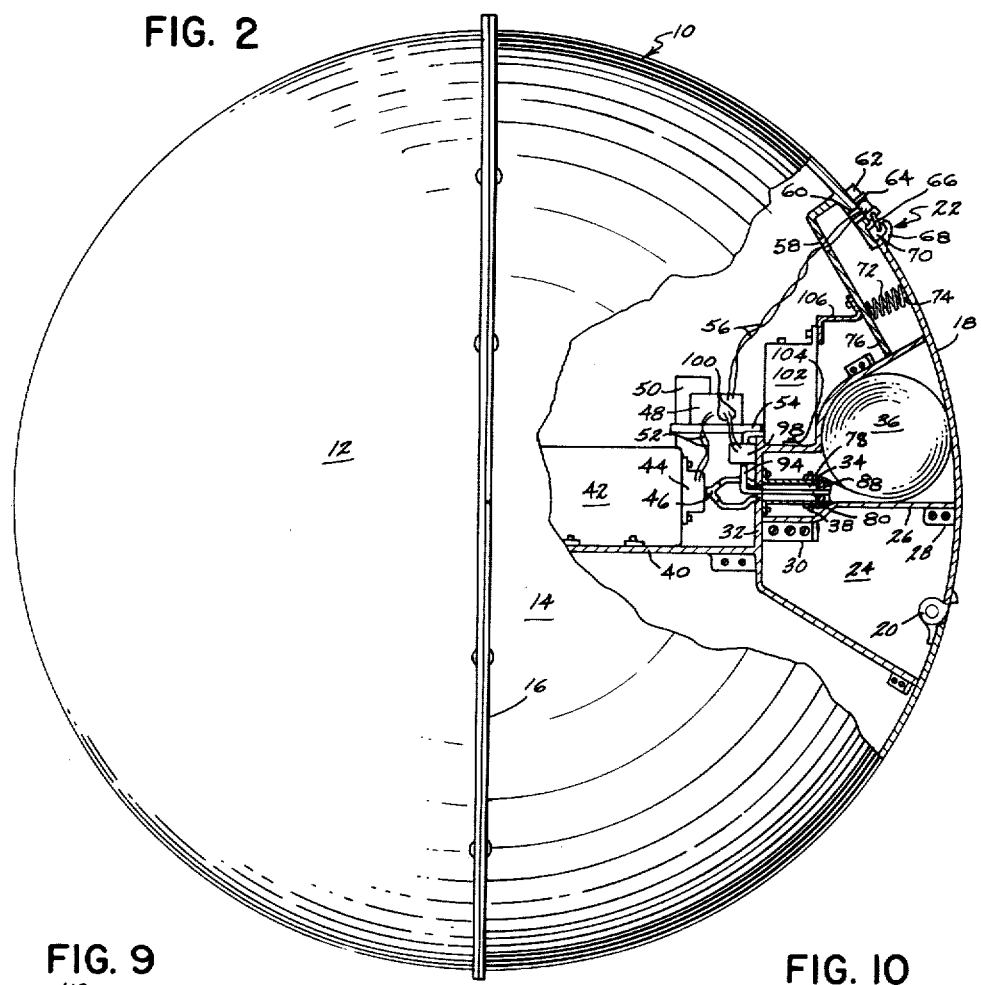

July 16, 1963 H. P. RAABE 3,098,229
TRANSMISSION LINE ERECTED BY PRESSURIZED PLASTIC
Filed June 17, 1959 4 Sheets-Sheet 4
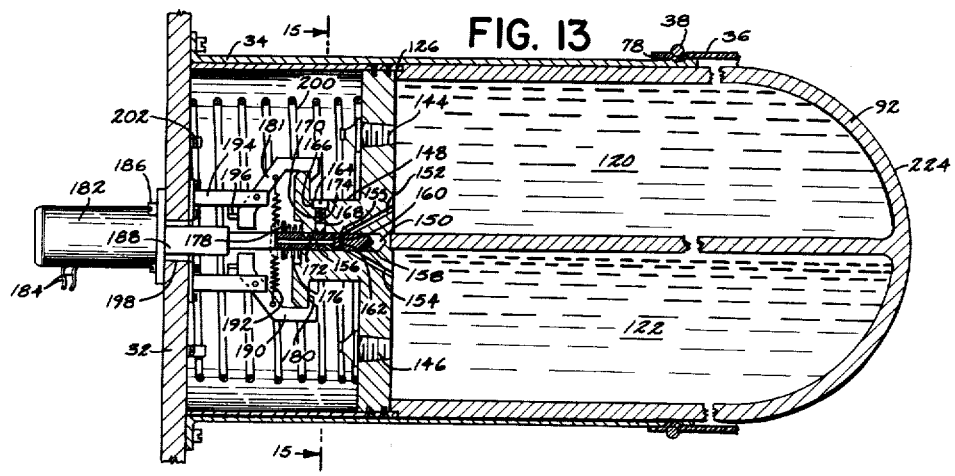
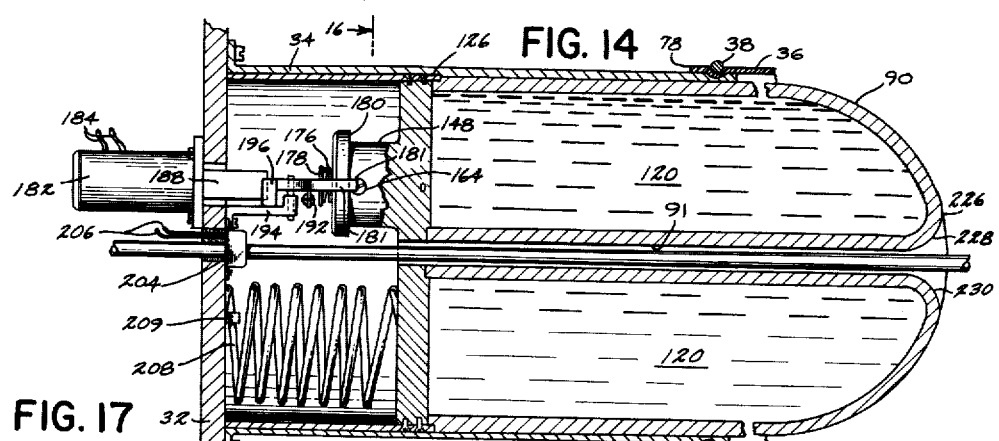
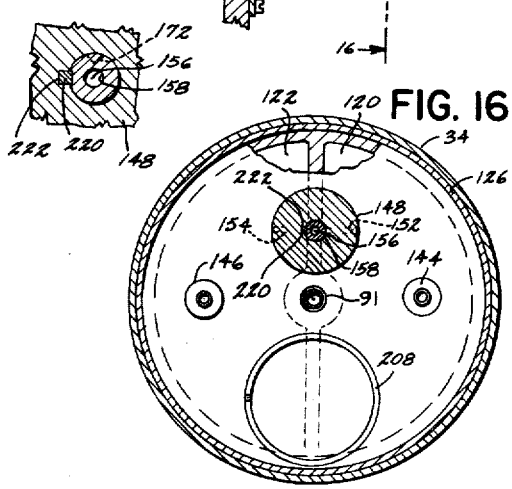
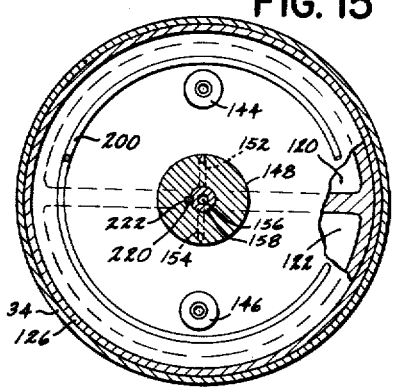
INVENTOR.
HERBERT P. RAABE
BY
William C. Babcock
ATTORNEY

United States Patent Office 3,098,229
Patented July 16, 1963

3,098,229
TRANSMISSION LINE ERECTED BY PRESSURIZED PLASTIC
Herbert P. Raabe, St. Paul, Minn., assignor to General Mills, Inc., a corporation of Delaware
Filed June 17, 1959, Ser. No. 820,917
21 Claims. (Cl. 343—705)

The present invention relates to transmission lines, and more particularly to extensible transmission lines which may be extended from an initially coiled and collapsed condition to an inflated and substantially rigid condition. The invention is particularly adapted for use in space ships, satellites and other vehicles.

Space ships and satellites must have some means of receiving and transmitting communication with the earth or other space-borne vehicles. In order to preserve power or to obtain high resolution for direction finding purposes, large antennas will be required which in turn necessitate the use of long transmission lines. In space-borne vehicles, transmission lines are required which are light and take up very little space when carried from the earth to their destination. Transmission lines according to the present state of the art, are very heavy and take up much space even if they are coiled during storage. The term "transmission line" is used herein to include waveguides, co-axial cables and the like.

Accordingly, one object of the invention is to provide an improved form of transmission line which will take up only limited space when not in use.

Another object is the provision of a lightweight metallized transmission line which may be coiled in a first position during storage and which may be easily and readily unfurled to a second position.

Another object is to provide a transmission line which may be unfurled from an initially collapsed and coiled condition to an inflated and substantially rigid condition.

A further object is to provide a transmission line which will not collapse if the cable is perforated by a foreign object.

Still another object is to provide a coaxial transmission line which is inflatable with a hardenable substance.

Other objects and advantages of the invention will become apparent from a consideration of the following specification and accompanying drawings in which:

FIG. 2 is a schematic front elevational view of the satellite illustrating a further embodiment of my invention;

FIG. 3 is a fragmentary front view of the partially inflated transmission line of FIG. 2;

FIG. 4 is a vertical sectional detail view taken along line 4—4 of FIG. 3 showing the cross-sectional area of the transmission line;

FIG. 9 is a vertical cross sectional detail view similar to FIG. 8 but showing a further modification;

FIG. 10 is a front view of a plunger to be used in combination with the modification of FIG. 9;

FIG. 13 is a schematic vertical side sectional view of a typical plunger utilized in FIG. 7;

FIG. 14 is a schematic vertical side elevational view in partial section of a typical plunger utilized in FIG. 6;

FIG. 15 is a vertical cross sectional detail view taken along line 15—15 of FIG. 13;

FIG. 16 is a vertical cross sectional detail view taken along line 16—16 of FIG. 14;

FIG. 17 is an enlarged cross sectional view of the valve pin shown in FIG. 15.

Figure 1:
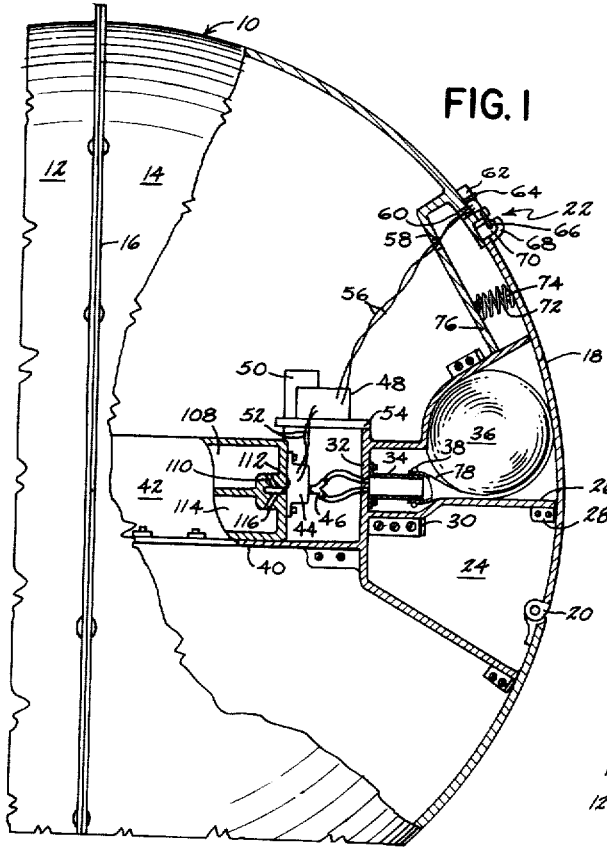
FIGURE 1 is a schematic elevational view of a satellite illustrating one embodiment of my invention, in which a transmission line is shown in a coiled and collapsed condition.

Before proceeding with a detailed description of my invention, a brief description of the invention and an example of one type of expansible, hardenable material, generally known as plastic foams, which could be used, will be presented.

The minimum material required for a co-axial transmission line is two metallic conductors of hollow, cylindrical shape, the second tube being co-axial with the first tube and being located within said first tube. At microwave frequencies the skin effect indicates that only a very thin foil would be needed for these conductors. In order to maintain the geometric relationship between the two conductors and to prevent the capacitance of the conductor from changing, certain supporting insulating material is required between said conductors. It should be pointed out that gas or a vacuum would be the best insulator between the conductors. However, this would be impractical from the standpoint of durability because if the cable were perforated the gas would escape and the transmission line would collapse.

The conductors used in my invention are flattened to a band and the transmission line is initially stored in a coiled position. At a desired time the transmission line is unfurled and inflated to an extended position by injecting an expansible non-conducting material into the interior of the outer conductor.

The material is of such a nature that it will solidify after it is injected into place, so that both conductors will remain in their geometrical relation with respect to each other, and the transmission line will be rigid and self-supporting and will not collapse if it is perforated by a foreign object.

In general, there are numerous insulating, expansible, hardenable materials known in the art which are commercially available that will meet the requirements needed for this invention.

Such materials may be prepared having a density when expanded ranging from one pound per cubic foot to forty pounds per cubic foot depending upon the strength characteristics needed. The ratio of the volume of the initial material to the volume of the final expanded product varies, depending upon the density of the material used; for example, materials are available which may have as high a ratio as 1:25.

Because of the conditions under which this invention may be used, it is desirable that no post curing of the expansible material be required; therefore a self-curing material would be desirable.

A specific class of insulating, expansible, hardenable material which may be used in the present invention are those compounds known as the urethane foams.

Self-curing urethane foams of the class noted above, may be conveniently prepared by the reaction of an organic diisocyanate, such as a 2, 4 toluene diisocyanate isomer, with a polyalkylene ether derivative containing at least two hydroxyl groups per molecule, in the presence of water and a basic organic catalyst, such as triethylamine. These foams are rigid and nonconductive and therefore particularly well suited for use in this invention.

The polyalkylene ether utilized in the above reaction may be conveniently prepared by the polymerization of an alkylene oxide such as propylene oxide and a polyhydroxyl compound such as glycerine in the presence of a suitable catalyst.

The four basic ingredients of the above noted urethane foam, the polyalkylene ether containing two or more hydroxyl groups per molecule, the diisocyanate, the water and the catalyst, may be combined into two liquid mixtures. The ether and the diisocyanate may be combined so as to constitute one liquid in one reservoir; and the water and the catalyst may be combined to constitute a second liquid in a second reservoir.

At a desired time the two mixtures are emitted from their respective reservoirs, and as they are emitted they will mix and react to form the expansible foamed plastic.

After the expansion process has been completed, the foam will harden, thereby keeping the two conductors in their geometrical relation and the transmission line will now be rigid and self-supporting.

While I have described one material which has the necessary qualifications to fulfill the requirements needed, it is not my intention to be restricted to the use of this particular product as there are other materials that possess the qualities necessary to achieve the result desired in this invention.

Referring to FIG. 1, a satellite 10 is shown comprised of two hemispherical sections 12 and 14, which are connected at 16 and which are fastened together in a suitable manner such as riveting, and sealed with a compound to make it air-tight. The satellite is constructed of two hemispheres so that the mechanism and instruments which are to be included inside the satellite may be installed, serviced and set up prior to lofting the satellite. An alternate method would be to provide a door through which the mechanisms and instruments could be inserted, serviced and set. However this may necessitate the use of a large door if any of the instruments were large.

A door 18, hinged at 20 and locked at 22, is provided so that a compartment 24 may be readily accessible. Said compartment is divided into two sections by a shelf 26 which is held in place by flanges 28 and 30, which are attached to the inner surface of the satellite 10.

A tubular sleeve 34 is attached at one end, to the rear vertical wall 32 of the compartment 24. Attached to the other end of the sleeve 34 is an unfurlable and inflatable transmission line 36 comprised of a hollow plastic tube 78, which is shown in a coiled position in FIG. 1. Metal band 38 securely attaches the tube 36 to the sleeve member 34.

A reservoir 42 is shown secured to a shelf 40, said shelf in turn is attached to the rear wall 32 of the compartment 24. Reservoir 42 is comprised of a first compartment or chamber 108 and a second compartment or chamber 114. Said compartments contain separate fluid mediums. The fluids are injected into the reservoir 42 under pressure and are emitted from the reservoir into the sleeve 34 upon actuation of a solenoid valve 44. Said valve is connected to the compartments 108 and 114 by means of a hollow channel 112, which has branches or ducts 110 and 116 connected to compartments 108 and 114, respectively. Tube 46 is provided to connect valve 44 to the sleeve 34.

Timer 48 is secured to a shelf 54 and may be actuated by a battery 50 or any other known means. Said timer is electrically connected to the solenoid valve 44 by wires 52, so that at a predetermined time the timer 48 will actuate the valve 44 and cause said valve to open and permit the fluid to be emitted from the reservoir into the sleeve 34.

Lock member 22 is comprised of two tabs, tab 70 which is rigidly secured to the outer surface of the satellite 10, and tab 68 which is rigidly secured to the door 18. A nylon rope 66 secures tabs 68, 70 together when the door 18 is closed. Rope 66 is further secured to a dynamite squib 62 which is attached to the satellite 10 by a clamp 64. Wires 56 electrically connect the dynamite squib 62 to the timer 48. A sealing compound at 58 and 60 aids in keeping the interior of the satellite 10 air-tight.

A coil spring 72 attached to a wall member 76 abuts against the door 18 so as to jettison said door open when it is unlocked. An insert member 74 aids in keeping spring 72 in the proper position relative to the door 18 when said door is closed.

Having described one embodiment of my invention, reference will now be made to the manner of unfurling and inflating the plastic tube 78 from an initially collapsed and coiled position to an inflated and extended position.

The timer 48 is pre-set so that at a predetermined time, an electrical charge is transmitted to the dynamite squib 62 by electrical wires 56, which causes the squib to explode. The nylon rope 66 is severed, thus causing the tabs 68, 70 to be free to separate and permit the door 18 to be opened. Spring 72 aids in opening said door, since the spring is under compression when the door is closed.

Timer 48 is pre-set at a second setting so that after the door 18 has been opened, the solenoid valve 44 will be actuated and the pressurized fluid within the compartments 108 and 114 will be permitted to flow through the ducts 110 and 116 into the channel 112. As the fluids flow through the channel 112, the valve 44, and the tube 46 into the sleeve 34, they will become substantially mixed.

The expansible and hardenable fluid which forms a plastic foam 118 (note FIG. 7), may be of the type previously discussed. As the fluid is injected into the sleeve 34 it will expand, and as it expands it causes the tube 78 to unfurl and inflate to an extended, rigid position.

The satellite 10 of FIG. 2 is similar to that of FIG. 1 but illustrating a different embodiment of my invention.

In this embodiment the transmission line 36 is comprised of two hollow plastic tubes, an outer tube which is designated generally by the numeral 78 and an inner hollow plastic tube 80, which is substantially co-axial with tube 78. A plunger member 88 is inserted within the outer tube 78 and has a central portion 89 removed therefrom so that the inner tube 80 may be inserted therein.

A compressed air tank 102 is attached to the upper surface of compartment 24 by bolts at 104 and a flange at 106, and is connected to the inner tube 80 by tube 94. A solenoid valve 98 is operatively connected to the tube 94 and prevents air from being injected into inner tube 80 until a desired time. Valve 98 is electrically connected to timer 48 by wires 100 and will be actuated so as to permit air to flow from the tank 102 into the inner tube 80 only after a predetermined time has elapsed.

The purpose of injecting air into the inner tube 80 is twofold. One reason is that as the air is forced into the initially flattened and coiled transmission line 36, the pressure of the air flow will tend to unfurl said transmission line and give it a semi-rigid extended shape. Furthermore, as the plunger 88 moves toward the extended end of the transmission line 36, the inflated tube 80 will serve as a means on which the plunger 88 may slide.

The second and perhaps most important reason for inflating inner tube 80 with air is that as certain foams expand, a substantial pressure is created, and in such cases the inner tube must be pressurized to prevent it from collapsing because of the external pressure exerted upon its surface.

The manner of unfurling and inflating this embodiment of my invention is similar to that of FIG. 1 but with the following modifications:

After the door 18 has been opened, the timer 48 actuates solenoid valve 98 which permits compressed air from tank 102 to flow through tube 94 into tube 80 to inflate said tube. Inflation of tube 80 aids in unfurling the transmission line 36 as described above. A second solenoid valve 44 is then actuated by the timer 48 which permits the expansible and hardenable fluid medium to flow into the tubular sleeve 34 in substantially the same manner as described hereinbefore, in explaining the manner of operation of my first embodiment. As the fluid expands, it forces the plunger 88 away from the sleeve 34 in a longitudinal direction relative to said sleeve. As the plunger moves in said longitudinal direction the transmission line 36 is unfurled and as the fluid hardens said transmission line assumes an extended, rigid position.

FIG. 3 shows a fragmentary front view of the partially inflated transmission line 36 and is comprised of two hollow plastic tubes 78 and 80. Adhered to the inner surface of the outer tube 78 is a lightweight conductive metal coating 124. Adhered to the outer surface of the inner tube 80 is a similar lightweight conductive metal coating 130. A plunger 88 which is of similar cross sectional shape as the outer tube 78 is inserted within said outer tube. Said plunger 88 has a central opening 89 through which the inner tube 80 is inserted.

As the fluid is injected into the outer tube 78, the foam expands and causes the plunger 88 to move in a longitudinal direction relative to the transmission line 36. The plunger 88 will aid in inflating the transmission line 36 and it also keeps the inner tube 80 in spaced relation relative to the outer tube 78.

Figure 5:
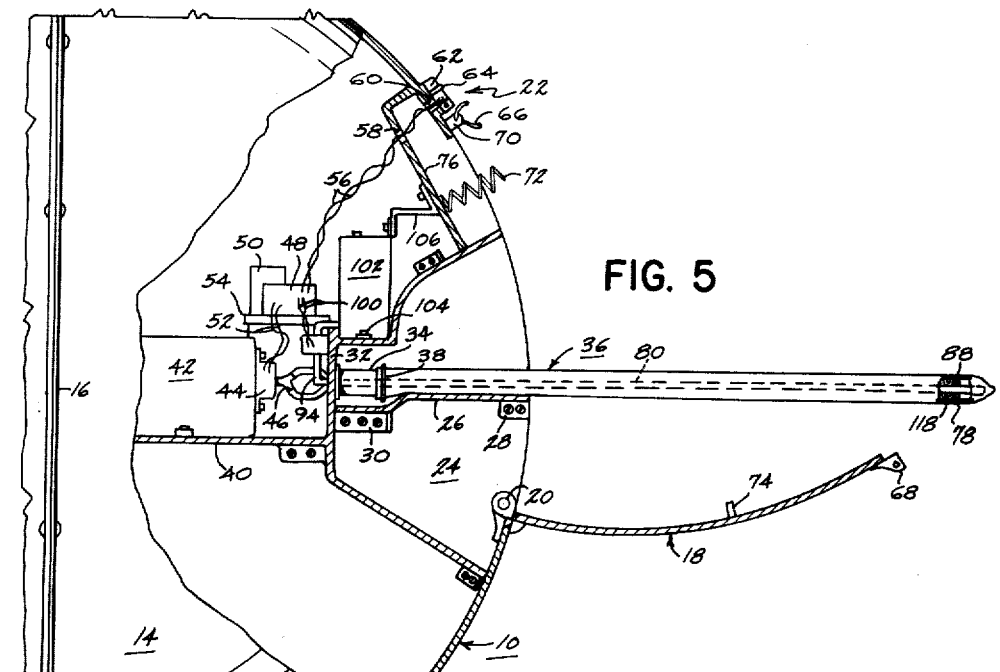
FIG. 5 is a fragmentary front elevational view of the satellite of FIG. 2 showing the transmission line unfurled and inflated in an extended position.

Referring to the drawing of FIG. 5 the transmission line of FIG. 2 is shown in an unfurled and inflated position. As the plunger 88 reaches the end of the transmission line 36 it will stop and form a seal so that the foam 118 cannot escape. Plunger 88 is made of material of low dielectric coefficient so that it does not affect the operation of the transmission line.

Figure 6:
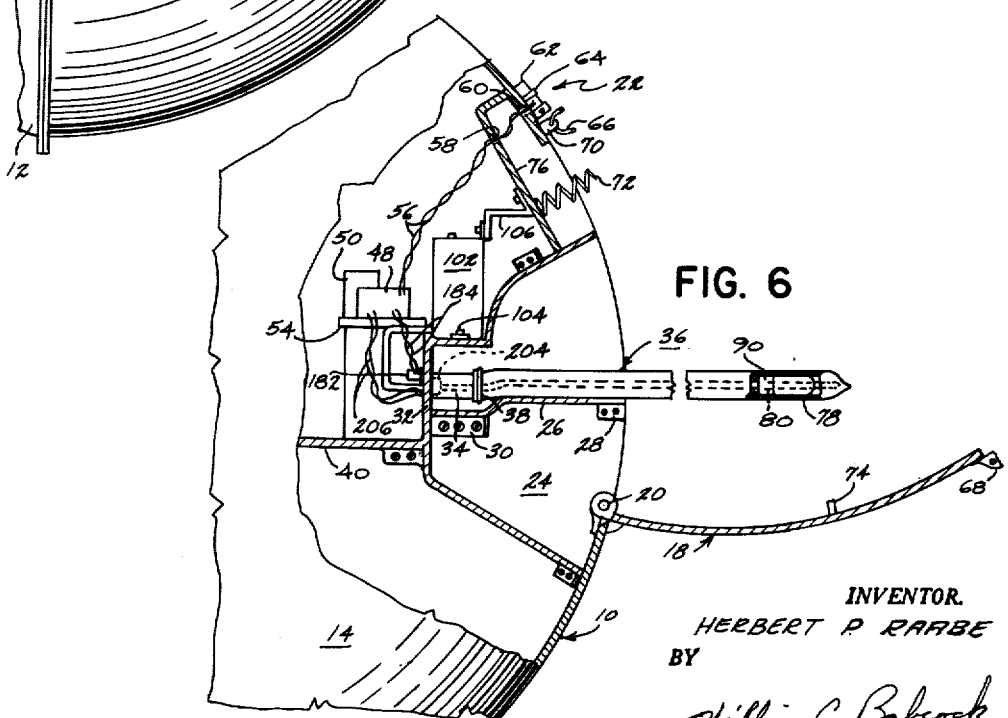
FIG. 6 is a fragmentary sectional view illustrating a further modification of my invention.

The satellite 10 of FIG. 6 is similar to the satellite 10 of FIGS. 1 and 2 but illustrates a further modification of my invention.

In this modification a hollow, substantially cylindrical shaped plunger 90 is used instead of the chamber or reservoir 42 with its associated mechanisms and attachments. Plunger 90 is located within the outer tube 78 and has a longitudinal central passage 91 through which the inner tube 80 may pass. Plunger 90 is comprised of two compartments which are filled with a fluid medium as shown in FIG. 14 and will be described in greater detail hereinafter.

A solenoid 182, electrically connected to the timer 48 by wires 184, actuates a valve on the plunger 90 to permit the fluid medium to be injected into the outer tube 78 at a desired time. A detailed description of this mechanism will be discussed below.

The operation of this embodiment is similar to the operation of the embodiment shown in FIG. 2 with the modification that the reservoir 42 has been excluded as described above, and the compartmented plunger 90 has been included. After the door 18 has been opened, and the inner tube has been inflated with air from the tank 102, the solenoid 182, which is operatively associated with the plunger 90, is actuated by the timer 48 and it permits the fluid medium contained within the plunger 90 to be ejected out of said plunger into the interior of the tube 78.

Figure 7:
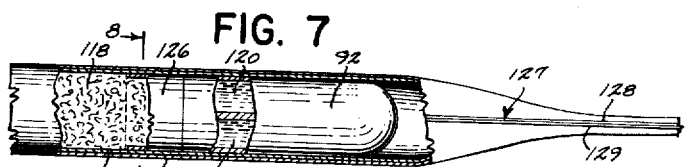
FIG. 7 is a schematic front elevational view of one embodiment of the transmission line having a compartmented plunger inserted therein.

In FIG. 7, a plunger 92, similar to the plunger 90 described above, is illustrated and shown within the tube 78. Plunger 92 is to be used in combination with a transmission line as shown in FIG. 1 in which only one conductive tube is used. Furthermore, as described above, when referring to plunger 90, plunger 92 forms the reservoir in which the fluid mediums are kept, and the reservoir 42 with its associated mechanisms and attachments is excluded.

Figure 8:
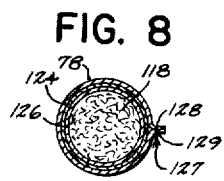
FIG. 8 is a vertical cross sectional detail view taken along the line 8—8 of FIG. 7.

Before proceeding with a detailed description of the plunger 92 and the method of unfurling and inflating the transmission line by using it, a brief description of the method of forming the tube 78 will be presented. As can be seen from FIG. 7 and more particularly FIG. 8, the tube 78 is of a substantially circular cross-sectional shape. Tube 78 is formed from a strip of plastic and has a metallized layer of conductive coating 124, such as aluminum, adhered to one surface. The width of the plastic exceeds the width of the metal coating to allow for a seam 127 comprised of lips 128 and 129. It is thus seen that tube 78 is coated except for the lips by the metal 124. To form the tube, the metallized plastic is folded along its center with the metal inside so that the two lips come in contact. The two lips are then sealed to form the seam 127 as shown in FIG. 8. The tube is sealed so that the two edges of the metal are substantially adjacent to each other.

The plunger 92 as shown in FIG. 7, is shown in greater detail in FIG. 13, and a detailed description of the plunger depicted in FIG. 13 will now be presented.

Plunger 92 is a substantially hollow, cylindrical shaped member, having substantially the same cross-sectional shape as the desired cross-sectional shape of the transmission line 36. Plunger 92 is comprised of a first compartment 120 and a second compartment 122 which contain separate fluid mediums. Plunger 92 has a smooth, curved portion 224 at its forward end, and a cylindrical member or guide 126 attached at its opposite end. Plunger 92 is curved at its forward end to permit said plunger to slide freely in a longitudinal direction relative to the transmission line 36. Guide 126 serves as a sleeve and abuts against the rear wall 32 when the plunger is positioned inside the sleeve 34. Guide 126 further aids in forming the fluid medium into a desired shape as said fluid is emitted from the plunger and as said fluid begins to harden.

Plunger 92 is filled with the fluid mediums before said plunger is inserted within the sleeve 34 and transmission line 36. Fluid is injected, under pressure, into compartment 120 through valve 144; similarly compartment 122 is filled under pressure through valve 146. Valves 144 and 146 prevent the fluid from being emitted from the plunger after said plunger has been filled.

Forming an integral part of the plunger 92 is a neck 148 which has a circumferential flange 180 projecting therefrom. Neck 148 has a throat 150 which extends longitudinally into the neck; a valve pin 158 is inserted within the throat 150. Compartments 120 and 122 are connected to the throat 150 by ducts 152 and 154, respectively. The diameters of ducts 152 and 154 will vary depending upon the ratio that the fluids are to be expelled with respect to each other from the compartments 120 and 122.

Valve pin 158 has a tubular opening or channel 156 extending longitudinally into said pin. Channel 156 has branches 160 and 162 which are of substantially the same cross-sectional dimension as the ducts 152 and 154 respectively. Flange 178 is attached to the projecting end of the pin 158. Valve pin 158 is secured to the plunger 92 by means of a coil spring 176. Spring 176 has one end attached to the flange 178 and its opposite end is attached to the neck 148. Spring 176 forces the pin 158 out of the neck 148 so that branches 160 and 162 do not align with ducts 152 and 154, respectively, thus preventing fluid from being emitted out of the compartments prematurely. It is envisioned that pin 158 will fit relatively tight within the throat 150 so as to prevent the fluids from leaking out of the pressurized chambers. Seal 155, which is comprised of an O-ring, encircles pin 158, and is provided to aid in preventing said leakage.

Pin 158 has a longitudinally extending key 220 secured thereto which is positioned within a keyway or slot 222. Slot 222 projects into the neck 148 and also extends longitudinally thereto. The length of key 220 and slot 222 does not extend up to or beyond the seal 155. Key 220 is provided to prevent the valve pin 158 from rotating relative to the plunger, and thus causing the ducts 152 and 154 to fail to align with branches 160 and 162 respectively when fluid is to be emitted from the compartments.

A screw 164 is threadedly inserted within a bore 174 and engages a detent 172 on the valve pin 158 when branches 160 and 162 are in proper alignment with the ducts 152 and 154, respectively. Screw 164 is comprised of two portions 166 and 168 which are separated by a spring 170, so that said screw may be compressed to a shortened dimension.

A release mechanism generally designated by the numeral 181 grasps the plunger 92 until such time that the transmission line 36 is to be unfurled and inflated. It is comprised of the following elements:

Solenoid 182 is attached by bolts 186 to the rear wall 32 of the compartment 24. Wires 184 electrically connect the solenoid 182 to the timer 48. A movable shouldered core 188 projects from the solenoid through an opening 198 in the wall 32 and abuts against the protruding end of the valve pin 158.

A pair of locking arms 190 which are connected by a spring 192 grip the flange 180 of the neck 148 of the plunger 92. A pair of support brackets 194 attached at one end to the rear wall 32 and attached at the other end to the locking arms 190 connect said locking arms in spaced relationship. A pair of stop lugs 196 prevent the locking arms 190 from closing entirely when the plunger 92 is not gripped.

A coil spring 200 which is attached to the wall 32 at 202 is provided to jettison the plunger 92 away from the wall 32 when the gripping arms 190 release said plunger.

The operation of this device proceeds in the following manner:

For purposes of illustration, plunger 92 will be assumed to be initially outside the tubular sleeve 34 and transmission line 36. At this time the reservoirs 120 and 122 are filled under pressure with the desired fluids as described hereinbefore. It should be noted that the valve pin 158 is forced out of the throat 150 by the spring 176, so that the branches 160 and 162 do not align with the ducts 152 and 154, respectively. Furthermore, the screw 164 does not engage the detent 172 when the valve pin 158 is in the protruding position.

Plunger 92 is then inserted wtihin the tubular sleeve 34 until guide 126 abuts against the rear wall 32. At this time the locking arms 190 will have engaged the flange 180 of the neck 148 and will grasp the flange 180 securely, the arms being pulled together by the spring 192. Transmission line 36 is now attached to the sleeve 34 and securely fastened thereto by the band 38.

As seen in FIG. 13, valve pin 158 is adjacent to the shouldered solenoid core 188. While current is supplied to said solenoid, the shouldered core 188 is in what I refer to as the "in" or first position. When the current is turned off by actuation of the timer 48, the shouldered core 188 is projected in a longitudinal direction away from the solenoid to what I refer to as the "out" or second position. Valve pin 158 is driven into the throat 150 by the shouldered core until the compressed screw 164 engages the detent 172. Branch 160 is now in alignment with duct 152 and branch 162 is in alignment with duct 154. At substantially the same time that the valve pin is actuated, core 188 engages the locking arms 190, and causes them to open and release the plunger 92. Plunger 92 is propelled away from the wall 32 by the spring 200, which is under compression when the plunger is grasped by the arms 190.

The compressed liquids within the compartments 120 and 122 are now permitted to flow through the ducts 152 and 154, into the branches 160 and 162, respectively, which are now in proper alignment with said ducts, and into channel 156. As the fluids flow through the channel 156 and are emitted into the interior of the sleeve 34 they become substantially mixed. The liquids, which have been hereinbefore described, will foam, expand, and subsequently harden after they have become mixed. As the expansion increases, the plunger 92 will be forced away from wall 32 in a longitudinal direction into the transmission line 36, thus causing the transmission line to unfurl and inflate to an extended, rigid position. As the plunger 92 reaches the end of the transmission line it will stop and form a seal so that the foam 118 cannot escape. The empty plunger does not effect the operation of the transmission line because it is made of material of low dielectric coefficient. In addition, the diameter of the outer conductor could be increased, or the diameter of the inner conductor reduced to compensate for the dielectric loading.

Plunger 92 which has been described above has been designed to be used in combination with a transmission line having only one hollow plastic tube. It is envisioned that various design modifications may be made so that a plunger embodying the same broad principles may be used in combination with different types and shapes of transmission lines.

For example, FIG. 14 illustrates a different embodiment of the plunger, and in particular illustrates a detailed disclosure of plunger 90 shown in FIG. 6. The design of plunger 90 is similar to that of plunger 92 described above but having several modifications.

The basic difference between this embodiment and the embodiment described above is that this embodiment is used in combination with a co-axial cable. It is therefore necessary that basic design modifications be made to permit the inner conducting tube to pass through the center of the plunger. It is therefore desirable that the neck, release mechanism and spring be rearranged to facilitate the incorporation of the inner conducting tube.

For purposes of illustration the neck and release mechanism are substantially the same as the neck and release mechanism shown in FIG. 13, the basic difference being that they are no longer substantially centrally positioned relative to the plunger, as they are in FIG. 13, but are off-set to one side so that the inner tube may be substantially co-axial with the outer tube (refer to FIG. 15 and FIG. 16). Furthermore, the release mechanism is revolved 90 degrees, so that its operation does not interfere with the inner tube. Spring 208 is off-set to the opposite side of the plunger and is therefore not substantially co-axial with the plunger as is the case in FIG. 13.

Proceeding now with a more detailed description of this embodiment, plunger 90 has a smooth, curved portion 226 at its forward end, for substantially the same purpose as curved portion 224 of plunger 92. In addition, plunger 92 is provided with curved portions 228 and 230 to prevent said plunger from snagging the inner tube 78 as said plunger moves in a longitudinal direction relative to the transmission line.

As can be seen in FIG. 16, the compartments of plunger 90 are no longer in a horizontal plane, as shown in plunger 92 of FIG. 15, but are in a vertical plane. Ducts 152 and 154 extend from the compartments 120 and 122 respectively through a portion of the neck 148 and into the throat 150 in substantially the same manner as described above. In order to obtain the proper ratio of the two fluids as they are emitted from compartments 120 and 122, it is necessary that the diameters of ducts 152 and 154 be accurately determined relative to each other.

Coil spring 208 is provided to jettison plunger 90 away from the rear wall 32 when said plunger is released by the release mechanism 181. Spring 208 is attached by clamps 209 to said rear wall and is in a compressed state when the plunger is grasped by locking arms 190.

A solenoid valve 204, electrically connected to the timer 48 by wires 206, is included to prevent air from inflating inner tube 80, from a compressed air tank (not shown in FIG. 14) until a desired time. The unfurling and inflating of transmission line 36 when plunger 90 is employed, proceeds in substantially the same manner as described above when plunger 92 is employed as shown in FIG. 13, but with the following modification:

Timer 48 actuates solenoid valve 204 after door 18 has been opened and before solenoid 182 is actuated. As valve 204 is opened, compressed air from tank 102 (refer to FIG. 6) inflates inner tube 80. Inflation of tube 80 aids in unfurling transmission line 36, and imparts a semi-rigid form to said inner tube.

Solenoid 182 is subsequently actuated by timer 48 and plunger 90 is released and forced away from the rear wall 32. The fluid mediums are emitted from said plunger in substantially the same manner as described hereinbefore regarding plunger 92. As the fluid mediums become substantially mixed, they expand and subsequently harden to form an extended, rigid transmission line.

Turning now to other features of my invention, for example, as seen in FIG. 9, a plurality of inner plastic tubes are included which are located inside the outer tube 78. Lightweight metal coatings 138, 140, 142, respectively, are adhered to the outer surface of said inner tubes. The plunger 96 as shown in FIG. 10 is intended for use inside the tube 78 when the embodiment as shown in FIG. 9 is used. The plunger 96 has a plurality of holes 132, 134, 136 through which the tubes 82, 84, 86 may be inserted.

Figure 12:
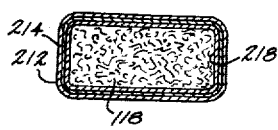
FIG. 12 is a vertical sectional detail view taken along line 12—12 of FIG. 11, showing the cross-sectional area of the transmission line.
Figure 11:
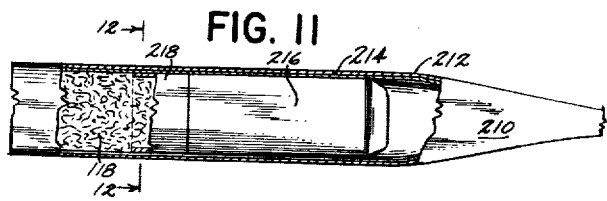
FIG. 11 is a schematic front elevational view of another embodiment of my invention.

Another embodiment of my invention is shown in FIG. 11. In this embodiment the transmission line 210 is of rectangular cross-sectional shape, as can be further viewed in FIG. 12. Transmission line 219 is comprised of a plastic tube 212 which has a lightweight conductive metal coating 214 adhered to its inner surface. A rectangular cross-sectional shaped plunger 216, having a guide member 218 of similar cross-sectional shape as the plunger 216, is attached to the rear end of said plunger.

In the above description a disclosure of the principles of this invention is presented, together with some of the embodiments by which the invention can be carried out.

I claim:

1. An extensible element for projection from a base member comprising in combination a collapsed, furled and inflatable tube, means for inflating and extending said element, said means including a movable member inserted within said tube, means for filling said tube with an expansible, hardenable medium thereby maintaining said tube in an unfurled, inflated and extended condition, said means, including a pressurized chamber for containing said medium in a liquid state, and means for discharging the medium from the chamber into the tube so as to impart an axial movement to the movable member.

2. An extensible element for projection from a base member comprising in combination a first collapsible, furlable tube, a second collapsible, furlable tube inserted within the first tube, said second tube being substantially coaxial with the first tube when unfurled, means for projecting the element from an initially collapsed and furled condition to an unfurled extended and inflated condition, said projecting means including means for at least partially filling the first tube with an expansible, hardenable medium and thereby maintaining said element in an extended and inflated condition, and means for inflating the second tube with air.

3. The combination of claim 2 wherein the first tube has a conductive metal coating adhered to its inner surface and the second tube has a conductive metal coating adhered to its outer surface.

4. An inflatable and unfurlable transmission line for projection from a space vehicle comprising in combination at least one flexible collapsible, furlable tube having a conductive metal coating adhered to one surface, means for securing one end of said tube to the space vehicle, means for inflating and unfurling the transmission line, said means including a movable member inserted within the tube, said member having substantially the same cross-sectional shape as the desired cross sectional shape of the transmission line, means for filling said transmission line with an expansible, hardenable fluid medium, said means including a pressurized chamber for containing said fluid medium, and means for discharging said medium from the chamber into the transmission line so as to impart an axial movement to the movable member.

5. The combination of claim 4 wherein the movable member includes the pressurized chamber for containing the fluid medium, and means for discharging said medium from one end of the movable member.

6. The combination of claim 5 wherein guide means are attached to and extend from the discharge end of the movable plunger to mold the expansible, hardenable medium into a desired shape as said medium is discharged from the movable medium.

7. The combination of claim 4 wherein means are provided for attaching the pressurized chamber containing the fluid medium near the secured end of the transmission line, tubular means are provided for connecting the chamber to said transmission line, and control means for controlling the discharge of the fluid medium into the transmission line are provided.

8. An inflatable and unfurlable transmission line for projection from a space vehicle comprising in combination means for connecting said transmission line to the space vehicle, a first collapsible, unfurlable conducting tube, a second collapsible unfurlable, conducting tube when unfurled inserted within the first tube, said second tube being substantially coaxial with the first tube when unfurled, means for inflating and unfurling the transmission line, said means including a movable member located within the first tube, said member having a central portion removed therefrom through which the second tube is inserted, and means for at least partially filling the first tube with an expansible, hardenable fluid medium.

9. An inflatable and unfurlable transmission line for projection from a space vehicle comprising in combination means for connecting said transmission line to the space vehicle, an outer collapsible, unfurlable conducting tube, an inner collapsible, unfurlable conducting tube inserted within the outer tube, said inner tube being substantially coaxial with the outer tube when unfurled, means for inflating and unfurling the transmission line, said means including a movable plunger located within the outer tube, said plunger having a central portion removed therefrom through which the inner tube is inserted, means for at least partially filling the outer tube with an expansible, hardenable fluid medium, said means including a pressurized chamber for containing said fluid medium, and means for discharging said medium from the chamber into the transmission line so as to impart an axial movement to the plunger.

10. The combination of claim 9 wherein the conducting tubes are comprised of thin plastic material having a conductive metal coating adhered to one surface, said tubes having sufficient flexibility whereby they may be substantially flattened into a band during storage.

11. The combination of claim 10 wherein means are provided for inflating the inner tube with air.

12. An inflatable and unfurlable transmission line for projection from a space vehicle comprising in combination means for securing one end of the transmission line to the space vehicle, said transmission line including at least one hollow, collapsible and unfurlable tube in an initially flattened, coiled and flexible condition, said tube having a lightweight, conductive metal coating adhered to and completely covering at least one surface, and means for inflating and unfurling the transmission line by at least partially filling the tube with an expansible, hardenable, non-conducting fluid medium whereby said transmission line becomes substantially inflated and extended to a rigid condition.

13. An inflatable and unfurlable transmission line for projection from a space vehicle comprising in combination means for securing one end of the transmission line to the space vehicle, said transmission line being comprised of a waveguide including at least one hollow, collapsible and unfurlable tube in an initially flattened, coiled and flexible condition, said tube having a lightweight, conductive metal coating adhered to one surface, and means for inflating and unfurling the transmission line and projecting it to an extended and substantially rigid position by inflating and unfurling the waveguide by at least partially filling the tube with an expansible, hardenable, non-conducting fluid medium whereby said transmission line becomes substantially inflated and extended to a second rigid condition, said means for inflating, unfurling and projecting the transmission line including a movable, pressurized, compartmented plunger inserted within the waveguide for containing said fluid medium, said plunger having substantially the same cross-sectional shape as the desired cross-sectional shape of the transmission line, and means for controlling the discharge of the fluid medium from one end of the plunger into the waveguide, whereby axial movement will be imparted to the movable plunger.

14. The combination of claim 13 wherein means are provided to mold the expansible, hardenable fluid medium into a desired shape as it is discharged from the compartmented plunger, said means including first guide means secured to and extending from the discharge end of said compartmented plunger, and second guide means secured to and extending from the secured end of the transmission line into said transmission line, said first and second guide means having substantially the same cross-sectional shape as the cross-sectional shape of the plunger.

15. An inflatable and unfurlable transmission line for projection from a space vehicle comprising in combination means for securing one end of the transmission line to the space vehicle, said transmission line being comprise of a coaxial cable, said coaxial cable comprised of a first hollow, collapsible tube having a lightweight, conductive metal coating adhered to its inner surface, a second hollow, collapsible tube having a lightweight, conductive metal coating adhered to its outer surface, said second tube positioned within the first tube and substantially coaxial therewith, means for inflating and unfurling the transmission line by at least partially filling the first tube with an expansible, hardenable, non-conducting fluid medium whereby said transmission line becomes substantially inflated and extended to a second rigid condition, said means including a movable plunger inserted within the first tube, said plunger having substantially the same cross-sectional shape as the desired cross-sectional shape of the transmission line, said plunger having a central opening whereby the second tube may be inserted therethrough, said means further including means for at least partially filling the first tube with said expansible, hardenable, non-conducting fluid medium, and means for inflating the second tube with air.

16. The combination of claim 15 wherein the means for inflating and unfurling the transmission line includes a pressurized chamber for containing the fluid medium, means for attaching said chamber near the secured end of the transmission line, tubular means for connecting the chamber to said transmission line, and means for controlling the discharge of the fluid medium into the transmission line whereby axial movement will be imparted to the movable plunger.

17. The combination of claim 15 wherein the means for inflating and unfurling the transmission line includes the movable plunger, said plunger including at least one pressurized chamber for containing the fluid medium, and means for controlling the discharge of the fluid medium from one end of the plunger into the first tube whereby axial movement will be imparted to the movable plunger as fluid is discharged therefrom.

18. The combination of claim 17 wherein means are provided to mold the expansible, hardenable fluid medium into a desired shape as it is discharged from the movable plunger, said means including first guide means secured to and extending from the discharge end of said plunger, and second guide means secured to and extending from the secured end of the transmission line into said transmission line, said first and second guide means having substantially the same cross-sectional shape as the cross-sectional shape of the plunger.

19. An extensible element for projection from a base member comprising in combination an outer collapsible tube, a plurality of inner, collapsible tubes inserted within the first tube and parallel thereto, means for inflating and extending said element, said means including a movable member inserted within the first tube, said member having a plurality of openings, whereby the inner tubes may be inserted therethrough, means for filling the inner tubes with air, and means for at least partially filling the outer tube with an expansible, hardenable medium.

20. An extensible element for projection from a base member comprising in combination a collapsed, furled and inflatable tube having flexible walls, a movable member inserted within said tube for unfurling and extending said tube, and means for at least partially filling said tube with an expansible hardenable substance thereby maintaining said tube in an unfurled, extended and inflated condition.

21. An inflatable and unfurlable transmission line for projection from a space vehicle comprising in combination means for securing one end of the transmission line to the space vehicle, said transmission line being comprised of a waveguide including at least one hollow, collapsible and unfurlable tube in an initially flattened, coiled and flexible condition, said tube having a lightweight, conductive metal coating adhered to one surface, and means for inflating and unfurling the transmission line and projecting it to an extended and substantially rigid position by at least partially filling the tube with an expansible, hardenable, non-conducting fluid medium whereby said transmission line becomes substantially inflated and extended to a second rigid condition, said means for inflating, unfurling and projecting the transmission line including a movable plunger inserted within the waveguide, said plunger having substantially the same cross-sectional shape as the desired cross-sectional shape of the transmission line, said means for at least partially filling the waveguide with an expansible, hardenable fluid medium including a pressurized chamber for containing the fluid medium, means for attaching said chamber near the secured end of the transmission line, tubular means for connecting the chamber to said transmission line, and means for controlling the discharge of the fluid medium into the transmission line whereby axial movement will be imparted to the movable plunger.

References Cited in the file of this patent

UNITED STATES PATENTS

| | | |
|---|---|---|
| 2,067,337 | Polatzek | Jan. 12, 1937 |
| 2,212,128 | Richter | Aug. 20, 1940 |
| 2,416,280 | Bennett | Feb. 25, 1947 |
| 2,646,504 | Gosline | July 21, 1953 |
| 2,812,769 | Schaefer et al. | Nov. 12, 1957 |
| 2,898,634 | Alderfer | Aug. 11, 1959 |

FOREIGN PATENTS

| | | |
|---|---|---|
| 742,760 | Great Britain | Jan. 4, 1956 |
| 1,036,966 | Germany | Aug. 21, 1958 |

UNITED STATES PATENT OFFICE
CERTIFICATE OF CORRECTION

Patent No. 3,098,229                                   July 16, 1963

Herbert P. Raabe

It is hereby certified that error appears in the above numbered patent requiring correction and that the said Letters Patent should read as corrected below.

Column 7, line 45, for "wtihin" read -- within --; column 10, lines 26 and 27, strike out "when unfurled"; column 11, lines 34 and 35, for "comprise" read -- comprised --.

Signed and sealed this 14th day of January 1964.

(SEAL)
Attest:
ERNEST W. SWIDER

EDWIN L. REYNOLDS

Attesting Officer                             Acting Commissioner of Patents